US005390233A

United States Patent [19]

Jensen et al.

[11] Patent Number: 5,390,233

[45] Date of Patent: Feb. 14, 1995

[54] TELEPHONE CALL TRANSFER BETWEEN A WIRELESS AND WIRED TELEPHONE

[75] Inventors: John P. Jensen, West Chicago, Ill.; Michael R. Ross, Westminster, Colo.

[73] Assignee: AT&T Corp., Murray Hill, N.J.

[21] Appl. No.: 114,567

[22] Filed: Aug. 31, 1993

[51] Int. Cl.[6] .............................................. H04M 11/00

[52] U.S. Cl. .......................................... 379/58; 379/61

[58] Field of Search ....................... 379/61, 58, 59, 63, 379/398, 399

[56] References Cited

U.S. PATENT DOCUMENTS

| | | | |
|---|---|---|---|
| 4,166,931 | 9/1979 | MacPherson et al. | 179/35 |
| 4,691,338 | 9/1987 | Makino | 379/61 |
| 4,839,918 | 6/1989 | Hata | 379/61 |

*Primary Examiner*—Curtis Kuntz
*Assistant Examiner*—Michael B. Chernoff
*Attorney, Agent, or Firm*—Charles L. Warren

[57] ABSTRACT

A wireless network controller supports telephone call between a wireless telephone and a wired telephone. First and second wired communication channels are connected to a telecommunication switch and the wired telephone, respectively. A third wired communication channel is coupled to a radio frequency base station that supports a plurality of concurrent wireless communication channels to wireless telephones. An interface circuit coupled to the first, second, and third channels switches the connection of the first channel associated with the telecommunication switch between the second and third channels, and hence between the wired and wireless telephones. Simultaneous connection to both the wireless and wired telephones is also supported. A conventional line terminating impedance is always presented to the switch regardless of whether one or both of the wireless and wired telephones are off-hook.

20 Claims, 3 Drawing Sheets

TELEPHONE CALL TRANSFER BETWEEN A WIRELESS AND WIRED TELEPHONE

CROSS REFERENCE TO RELATED APPLICATION

This application is related to the application rifled "Infrastructure Equipment in a Wireless Communication System Serves Different Service Providers" having inventors David Lee Chavez, Jr., Donald Dean Gallagher, and Lawrence Douglas Henderson.

BACKGROUND OF THE INVENTION

The present invention is generally directed to a telecommunication system which supports both conventional telephones connected by wire communication channels to a central office switch and wireless telephones coupled by wireless communication channels to base stations which are, in turn, coupled by wire communication channels to the telecommunication system. The present invention is more specifically directed to an apparatus and method which permits an in-progress telephone call to either a wire or wireless telephone to be transferred to the other without requiring additional action by the telecommunications switch.

Relatively inexpensive wireless telephone sets known as "cordless" telephones are available for use primarily in homes and consist of a base unit connected as an extension phone and a portable handset coupled by an RF communication channel with the base unit. Although a wireless communication channel is involved for cordless telephones, they function essentially as a conventional telephone connected by a long extension cord. That is, the base units of such telephone sets provide limited range and are not designed to support a plurality of subscribers with concurrent available wireless channels. Cordless telephones are connected in parallel with wired telephones resulting in a decrease in signal (audio) level and undesired impedance termination of the line when the cordless and a wired telephone are off-hook or active at the same time.

Conventional cellular communication systems issue a telephone number for a user's wireless telephone which differs from the same user's conventional wired telephone. This may require a party desiring to call the user to call both the wired and wireless telephone numbers in order to reach a particular party. Also, consider the situation in an office environment in which a user is engaged in a telephone conversation using a conventional wired telephone and has to leave the office to travel to another location in the building. Even if such a user also had a wireless telephone, the user could not continue the existing conversation by transferring to his wireless telephone without reestablishing another connection (separate call) to the same party since conventional cellular wireless communication systems do not permit a transfer of an existing conversation between wired and wireless telephones.

SUMMARY OF THE INVENTION

It is an object of the present invention to provide a telecommunication system where wireless telephones and conventional wired telephones are integrated to permit an in-progress telephone conversation to be transferred between wired and wireless telephones without further action by the telecommunication switch that facilitated the initial call completion.

A further object is to support concurrent use of a wireless telephone and a wired telephone on the same telephone line without causing a loss of signal (audio) level and while maintaining a desired line termination impedance.

In accordance with an embodiment of the present invention, a wireless network controller supports the transfer of an in-progress telephone call between a wireless telephone and a wired telephone. First and second wired communication channels are connected to a telecommunications switch and the wired telephone, respectively. A third wired communication channel is coupled to a radio frequency base station that supports a plurality of concurrent wireless communication channels to wireless telephones. An interface circuit coupled to the first, second and third channels switches the connection of the first channel associated with the telecommunications switch between and second and third channels, and hence switches the established connection between the wired and wireless telephones.

DETAILED DESCRIPTION

Figure 1:
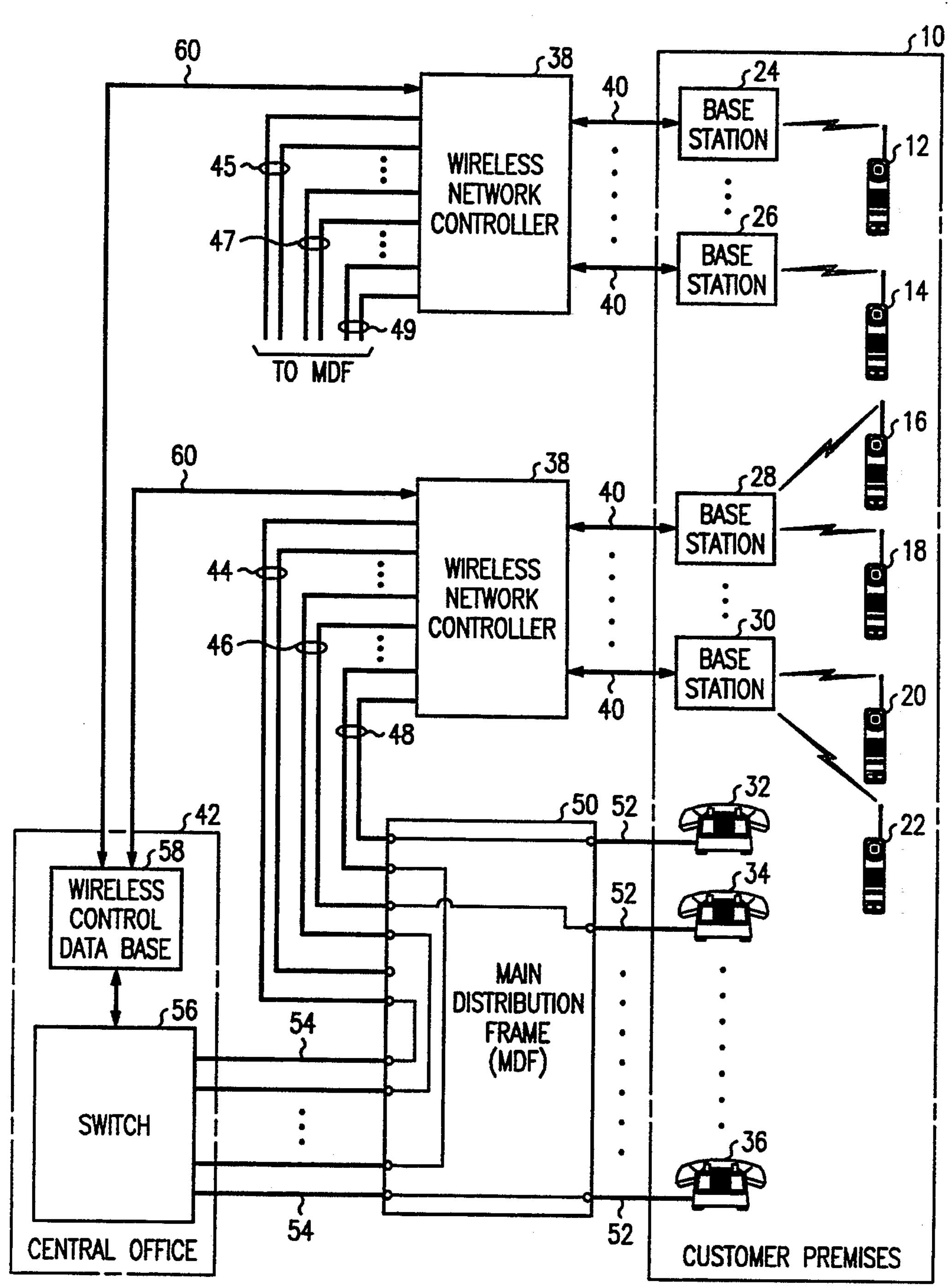
FIG. 1 is a block diagram of a telecommunication system which incorporates an embodiment of the present invention.

FIG. 1 illustrates a telecommunications system in accordance with the present invention wherein users having wireless telephones 12–22 are provided wireless communications within customer premises location 10 such as a university campus, shopping mall or business complex. A plurality of wireless base stations 24–30 provide wireless communication channels for the wireless telephones. In the illustrative example, base stations 24 and 28 support a first group of subscribers via wireless telephones 12, 16 and 18; base stations 26 and 30 support a second group of subscribers via wireless telephones 14, 20 and 22. Each base station is capable of concurrently supporting a plurality of wireless communication channels.

The wireless telephone users comprise groups of tenants in which users of like characteristics are normally members of the same tenant group. For example, groups of employees of different companies who work at locations within customer premises 10 may comprise respective groups of tenants with each company being a service provider. A predetermined set of base stations is assigned to support each tenant group. Preferably, a base station cannot be accessed by a user who is a member of a tenant group not assigned to that base station.

Also located at the customer premises 10 are a plurality of conventional wired telephones 32, 34, and 36. Generally, wired telephones on the customer premises are available to all who desire conventional telephone service. In this example, the telephones 32 and 34 are associated with users who also have wireless telephones 16 and 20, respectively; telephone 36 is associated with a user who is not a wireless telephone subscriber. It will be apparent that users may subscribe for only a conventional wire line telephone, for only a wireless telephone, or may subscribe to have both a wired and a wireless telephone.

Each base station is connected to a wireless network controller (WNC) 38 by a wire communication channel 40 which supports voice and control communication channels, which may consist of multiplexed channels, so that a plurality of users can be concurrently supported. The wireless network controllers 38 provide operational commands to the connected base stations and receive status reports from the base stations over the control communication channel carried by communication channel 40. The wireless network controllers 38 provide a voice channel link between the associated base stations that support the wireless telephones and central office 42. In the preferred embodiment, a plurality of pairs of wire telephone lines as represented by telephone line pairs 44–49, connect the wireless network controllers 38 to a main distribution frame 50. A pair of telephone lines from the WNC is provided for each wireless telephone voice channel supported by the WNC. In the illustrative example, one of the pairs of telephone lines may be connected by the main distribution frame 50 via wire communication line 52 to a conventional wired telephone. The other of the pair of telephone lines connecting wireless network controller 38 to main distribution frame 50, is connected by lines 54 to telecommunication switch 56 of central office 42. Although a switch 56 is shown in a central office 42 in the illustrative embodiment, an intelligent switching device such as a PBX could also be used with the present invention. Connecting conventional telephones through the main distribution frame 50 to wireless network controller 38 permits the WNC to couple a central office switch line 54 to either the wired telephone or a wireless telephone; operation of the WNC is explained below. A wireless control database 58 of the central office 42 is coupled by communication channel 60 to the WNC's 38 and provides a source of information to the WNC's relating to both wired and wireless users in the illustrated system. The database 58 can also be coupled to switch 56 and provide an information source for the switch as well. However, the information stored in the database relating to the wireless telephones could also be stored in a separate database such as located outside of the central office or contained as part of the WNC.

Figure 2:
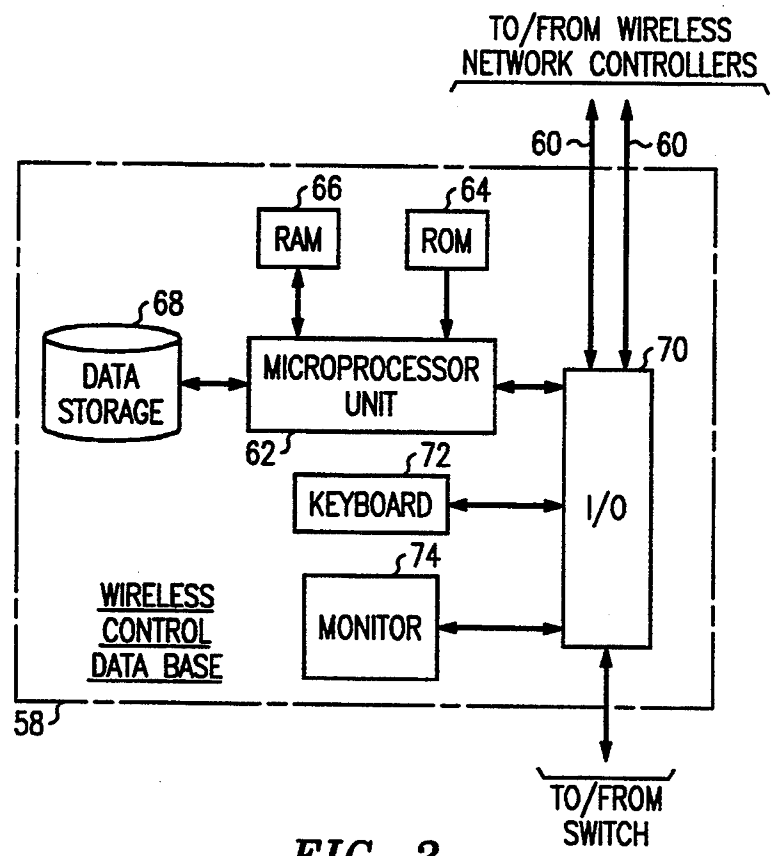
FIG. 2 is a block diagram of a wireless control database as shown in FIG. 1.

FIG. 2 illustrates an embodiment of the wireless control database 58 which includes a microprocessor unit 62 which operates in conjunction with read only memory (ROM) 64, random access memory (RAM) 66, and a data storage facility 68 which may comprise a disk drive or other storage media. A conventional input/output (I/O) peripheral 70 is coupled to microprocessor unit 62 and provides input/output to the switch 56 and the wireless network controllers by channels 60. A conventional keyboard 72 and monitor 74 are coupled to the microprocessor unit 62 via I/O peripheral 70, and provides access to a local administrator of the wireless control database 58. Normally the data relevant to an inquiry is loaded into RAM 66 from data storage device 68, and then searched or other, vise processed by microprocessor unit 62 using known software methods.

Figure 3:
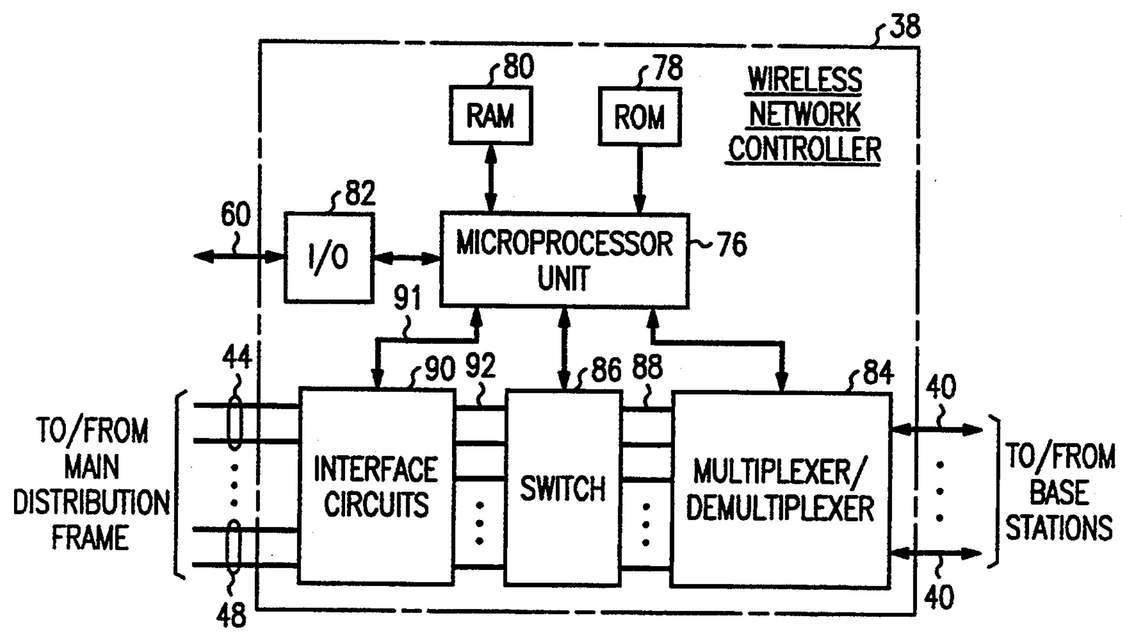
FIG. 3 is a block diagram of a wireless network controller as shown in FIG. 1.

Referring to FIG. 3, the wireless network controller 38 includes a microprocessor unit 76 which operates under the control of a program stored in ROM 78 and utilizes RAM 80 for data storage. An input/output peripheral 82 provides an interface between microprocessor 76 and the channel 60 which couples the controller to wireless control database 58. A multiplexer/demultiplexer 84 operating under the control of microprocessor 76 serves to multiplex and demultiplex the control and communication channels carried on fines 40, which are coupled to the supported base stations. In the illustrated example, lines 40 carry multiplexed communications capable of supporting a plurality of voice and control channels to each base station. Communication fines 88 each carry a single service communication channel which may carry subscriber voice or data from the multiplexer/demultiplexer 84 to switch 86. A conventional matrix connection of lines 88 and line 92 is made by switch 86 which is controlled by microprocessor unit 76. Interface circuits 90 couple the pairs of telephone lines 44–49 to the switch 86 via lines 92. Each pair consists of one 2-wire line coupled to a line 54 of telecommunication switch 56 and another 2-wire line which can be coupled to a line 52 of a wired telephone. For each of the pairs of telephone lines, a separate interface circuit selectably couples a telephone line 54 from telecommunication switch 56 to a conventional wire telephone or to a wireless telephone via a line 92, switch 86, a line 88, multiplexer/demultiplexer 84, a line 40, and the base station that provides the wireless communication channels to the desired wireless telephone.

Figure 4:
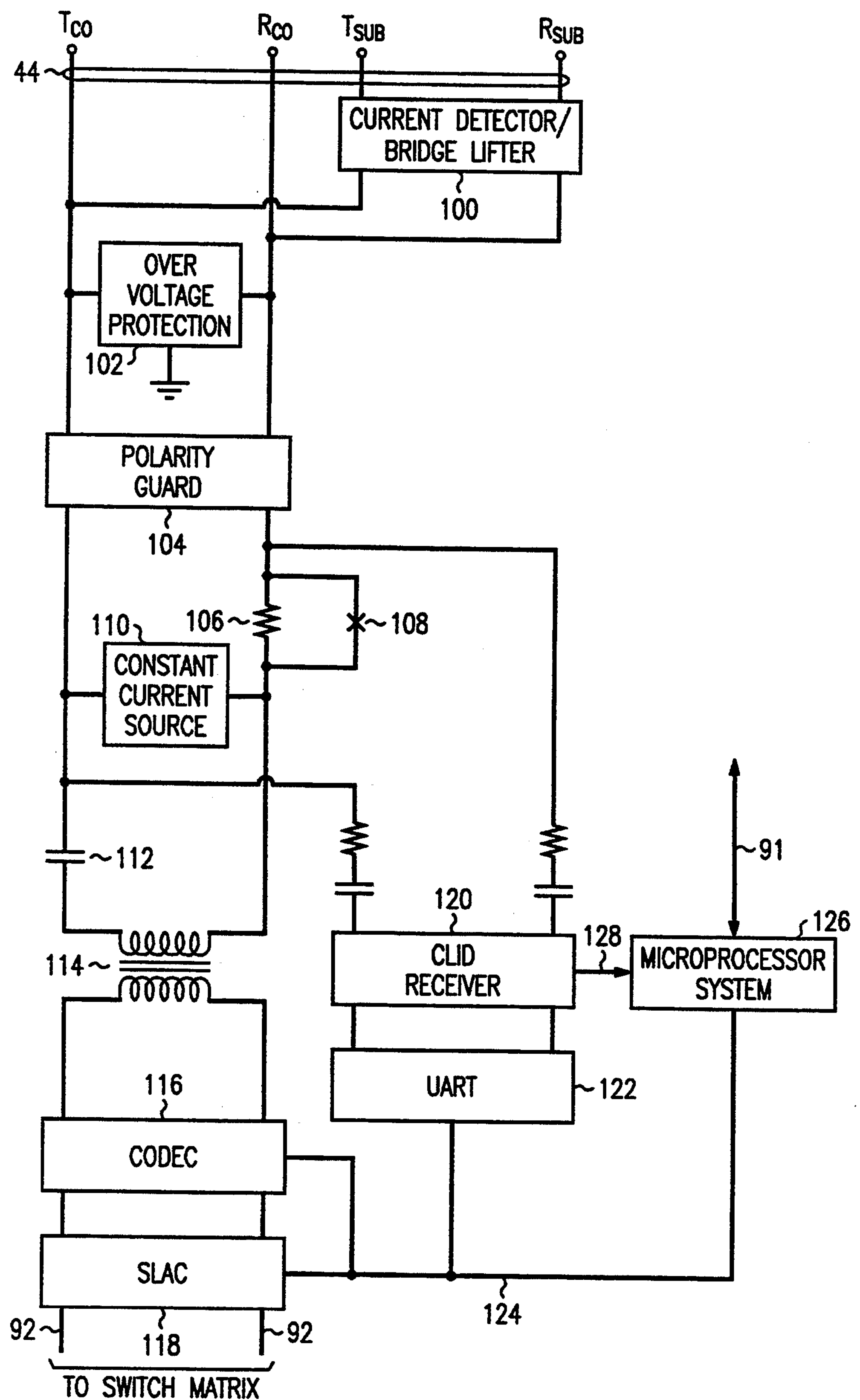
FIG. 4 is a block diagram of an interface circuit as shown in FIG. 3.

FIG. 4 illustrates one of a plurality of like interface circuits which are coupled to each pair of telephone lines connected to the WNC; these circuits collectively comprise interface circuits 90. The illustrated circuit controls whether the tip and ring lines $T_{co}$, $R_{co}$, which are connected by MDF 50 and line 54 to telecommunication switch 56, are coupled to a wireless telephone by line 92 or a conventional wired telephone by tip and ring lines $T_{SUB}$, $R_{SUB}$. Each interface circuit is connected by a bus 91 to microprocessor 76 (see FIG. 3).

A current detector and bridge lifter circuit 100, such as an AT&T miniature bridge lifter model 410A, is coupled to the $T_{SUB}$ and $R_{SUB}$ lines. The current detector portion of circuit 100 monitors the status of the wired telephone, i.e. on-hook or off-hook, by detecting current flow. The bridge lifter circuit 100 uses the on/-off-hook status to control the AC impedance looking toward Tsub/Rsub from Tco/Rco. While an on-hook status is sensed, the impedance is high to simnulate a conventional on-hook wired telephone; while an off-hook status is sensed, the impedance is low to simulate a conventional off hook wired telephone. Thus the bridge lifter allows transmission losses to be controlled. Subscriber loops have characteristics which the interface circuits must match to prevent effects such as echo and signal loss. The circuit 100 also provides a signal to microprocessor 126 indicative of the on/off-hook status which may cause adjustment of the impedance presented to Tco/Rco from the wireless telephone circuitry. The bridge lifter 100 and SLAC 118 cooperate to control the impedance seen by Tco/Rco to prevent the end users from noticing a difference in signal level regardless of the state of the coupled wired and wireless telephones. Further information concerning the bridge lifter can be obtained by referring to U.S. Pat. No. 4,166,931.

A conventional overvoltage protection circuit 102 is connected across the $T_{co}$ and $R_{co}$ lines to provide protection against hazardous high voltages. A polarity guard circuit 104 such as comprising diodes protects the remainder of the illustrated interface circuit should a reverse polarity condition occur such as a reverse connection between tip and ring at the central office. Resistor 106 and relay contact 108 combine to provide ringing signal load and the ring trip function. The relay (not shown) associated with contact 108 is controlled by microprocessor 126. When ringing is provided from the central office via Tco/Rco lines, resistor 106 causes the wireless circuitry to look like an on-hook telephone. Relay contact 108 is open and constant current source 110 is not drawing current to simulate an off-hook condition to Tco/Rco except when the wireless telephone is off-hook. The CLID receiver 120 which includes a ring detector will sense the ringing, provide a signal indicating same to the microprocessor 126 which will cause the wireless telephone to be notified it should ring. If the wireless telephone goes off-hook during ringing, a control signal from the microprocessor to the relay will close relay contact 108 and cause the constant current source 110 to draw current, thereby ting tripping the ringing signal.

A constant current source 110 is utilized to signal the central office switch of a demand for service by establishing a DC current flow on lines $T_{co}$ and $R_{co}$ when a communication path is to be established to a wireless telephone. The current source 110 is controlled by the microprocessor 126 in response to the current detector portion of circuit 100. When the wired telephone is on-hook, the current source will sink sufficient current via Tco/Rco to signal an off-hook of the wireless telephone. If the wired telephone goes off-hook, the current source will not sink DC current. This allows the correct amount of current to be supplied to (sunk by) the wired telephone, ensuring the AC gain of the microphone of the wired telephone is correctly set. This allows both the wired and wireless telephones to be off-hook and still provide the Tco/Rco line with the expected conventional impedance.

Capacitor 112 isolates the audio coupling transformer 114 from DC current and permits the constant current source 110 to control the DC current flow independent of the presence of transformer 114. A codec 116 provides a traditional coding and decoding capability wherein analog voice coupled by transformer 114 is coded into a digital format. Similarly, the codec 116 receives digital voice information via lines 92 and converts (decodes) it to analog voice which is coupled to transformer 114. An Advanced Micro Devices AM79C02 can be used to provide both the codec and subscriber line audio processing (SLAC) functions. The SLAC 118 adjusts the impedance on the CODEC side of the transformer 114 so that transmission characteristics are correct. These impedances will change depending on the status of the wireless and wired telephones. The microprocessor 126 controls the impedance presented by the SLAC in response to the current detector of circuit 100 and wireless telephone status.

A calling line identification (CLID) receiver 120, which may comprise a Motorola MC145447, is coupled across the central office side of transformer 114 via a series resistor-capacitor combination that provides isolation and detects calling line identification signals (FSK signals) transmitted from the central office switch. The calling line identification is transferred in digital form to a universal asynchronous receiver/transmitter (UART) 122, which transmits it to a communication bus 124. A microprocessor system 126, which includes a known arrangement of a microprocessor, ROM, RAM, and required supporting peripherals such as input/output peripherals, is coupled to bus 124 and to communication line 91, which provides communications with microprocessor unit 76 in the WNC. An input on line 128 from the CLID receiver 120 provides an alert to microprocessor system 126 upon the receipt of a calling line identification signal for the system 126 to receive the digitally formatted CLID information via bus 124 from UART 122.

The CLID information is sent on to the wireless telephone where it can be used such as in a visual display, if the telephone is capable of such display.

As an example of an aspect of the illustrated embodiment of the present invention, base stations 24 and 28 support a first group of subscribers (tenants) associated with service provider X, and base stations 26 and 30 support a second group of subscribers associated with service provider Y. Subscribers in the second group are not provided voice communication access via base stations 26 and 30, and likewise subscribers in the first group are not provided voice communications via base stations 26 and 30.

It will be apparent to those skilled in the art that a prospective subscriber must first become a member of one of the supported groups of tenants by registering with the telecommunication system. More specifically, a unique identification number associated with each wireless telephone must be entered in wireless control database 58 along with the directory number associated with the subscriber, the tenant group, and the corresponding port of switch 56, i.e. which of the lines 54, are associated with the corresponding directory number. The database 58 also stores a list of base stations assigned each tenant group to facilitate a determination if a particular base station can be utilized to support a subscriber.

In this example, the subscriber associated with wireless telephone 16 of the second group of tenants is also associated with conventional wire telephone 32. The subscriber causes wireless telephone 16 to initiate a request for service. Assuming the subscriber is within the range of base station 28 (or another base station that supports the second group of tenants) and the request for service from wireless telephone 16 is received by the base station, the base station will relay the request via communication line 40 to wireless network controller 38. Confirmation that wireless telephone 16 is an authorized user is begun by the WNC 38 transmitting an access request message that includes the identification number of the requesting wireless telephone 16 to wireless control database 58 over channel 60. In response, the wireless control database 58 checks its data, locates the identification number of wireless telephone 16, and transmits a reply message consisting of the record associated with the identification number to the wireless network controller 38. Database 58 also transmits other data relevant to the requesting user to the wireless network controller such as that telephone wire pair 48 should be used to support the requested communications since the subscriber is also supported by wire telephone 32, which is serviced by one of the telephone wire pairs 48. In response to the information received from database 58, the wireless network controller 38 makes the decision of whether access will be granted. If access is granted, the WNC 38 provides a command signal via communication one 40 to base station 28 which instructs the base station to open an available communication channel with the wireless telephone 16 utilizing the interface circuit 90 coupled to the telephone wire pair 48.

Referring to FIGS. 3 and 4, one of the multiplex channels carried by line 40 will be assigned for voice communications in response to the request. The voice channel assigned to wireless telephone 16 is coupled by one of lines 88 to switch 86 which, under the control of microprocessor unit 76, is connected to a corresponding voice channel via one of lines 92 to the interface circuit 90 which supports the telephone line pair 48. The constant current source 110 of the corresponding interface circuit is activated thereby establishing DC current flow over lines $T_{co}$, $R_{co}$ and connected line 54. This current flow is interpreted by the central office telecommunication switch 56 as a request for service. In response, the switch provides conventional dial tone, which is transmitted via the associated interface circuit 90 to the wireless telephone 16. The user then enters the number to be called, such as by utilizing a conventional Touch-tone pad associated with wireless telephone 16. The current detector/bridge lifter circuit 100 for the corresponding interface circuit, having detected no current flow through the $T_{SUB}$ and $R_{SUB}$ lines since the associated wire telephone 32 is on-hook, will present a high impedance to the connected line $T_{co}$, $R_{co}$ coupled to the central office. At the conclusion of the call, the user causes the wireless telephone 16 to initiate an on-hook or end of communication transmission, which will cause the established communication path to be released.

Another aspect of the present invention addresses the transfer of in-progress calls between wired and wireless telephones. Assume that the physical location of wire telephone 32 is within the range of base station 28, that communications have been established via wireless telephone 16 between a subscriber and another party through central office 42, and that this subscriber subscribes for both wireless telephone 16 and wire telephone 32. The subscriber using wireless telephone 16 within the customer premises 10 walks toward the associated wire telephone 32 which may be located in the subscriber's office. Upon the subscriber reaching his office, the subscriber desires to continue the current conversation, but would prefer continuing the conversation utilizing wire telephone 32. The subscriber picks up the receiver of wire telephone 32 thereby providing a low DC impedance on the $T_{SUB}$, $R_{SUB}$ lines of the connected interface circuit 90 indicative of a request for service. Since the wire telephone 32 is connected via the main distribution frame 50 and the wire pair 48 to the interface circuit 90 that also supports the current communication path with wireless telephone 16, the current detector/bridge lifter circuit 100 of the interface circuit detects the low impedance on the $T_{SUB}$, $R_{SUB}$ lines. As a result, circuit 100 connects line $T_{SUB}$, $R_{SUB}$ to the line $T_{co}$, $R_{co}$ which is connected to the central office switch 56.

At this time, both the wireless telephone 16 and the wire telephone 32 will be coupled to the central office switch line 54 associated with the subject subscriber. Although both the wired and wireless telephones could both be used to have a two-party conference with the party connected via the CO, assume that the subscriber then causes the wireless telephone 16 to initiate an on-hook, or end of communication signal thereby causing the wireless communication path up to the interface circuit to be dropped. In the interface circuit, the constant current source 110, which was previously active or drawing current, is inhibited under the control of the microprocessor 126. The SLAC 118 receives a signal from the microprocessor 126 causing it to change from a low to a high impedance. Relay contact 108 also opens upon the wireless telephone going on hook to cause a high impedance to be reflected to the Tco/Rco lines. However, the communication path from the interface circuit to the central office switch line is maintained in view of the current flow provided through current detector/bridge lifter 100 and the conventional wire telephone 32. Thus, the subscriber continues the conversation initiated with the wireless telephone using his wire telephone 32 without: (a) loss of connection with the other party: (b) requiring a new call origination; (c) requiring any additional actions by the telecommunication switch 56. It will be apparent to those skilled in the art that it may be desired to provide the switch 56 with an indication of this transfer such as for billing purposes; however, no action, by switch 56 is needed to effectuate the actual transfer of communications between wireless and wired telephones.

Where a subscriber desires both a wireless and wire telephone associated with the same directory number and central office port, an incoming call causes the wire telephone to ting and will also cause a wireless communication path to be made to the wireless telephone which will also ring. The subscriber will then have the option of answering the wire, wireless, or both telephones and, as explained above, can transfer between the wireless telephone and the wire telephone if later desired.

It will be apparent to those skilled in the an that various modifications can be made to the illustrative embodiment. For example, each tenant group could be served by a defined set of wireless communication channels instead of a defined set of base stations so that a base station capable of handling several channels could receive more than one tenant group.

Although an embodiment of the present invention has been described above and illustrated in the drawings, the scope of the invention is defined by the claims which follow.

We claim:

1. A telecommunication arrangement that supports the transfer of an in-progress telephone call between a wireless telephone and a wired telephone comprising:

first and second communication channels connected to a telecommunication switch and a wired telephone, respectively;

third communication channel coupled to a radio frequency base station that supports at least one wireless communication channel to a wireless telephone;

interface circuit means coupled to said first, second, and third channels for coupling said first channel among said second and third channels, said interface circuit means including:

first means for connecting said first channel to one of said second and third channels thereby establishing a first call connection between the telecommunication switch and one of the wired and wireless telephones;

second means for connecting said first channel to the other of said second and third channels thereby establishing a second call connection between the telecommunication switch and the other of the wired and wireless telephones without causing the telecommunication switch to release said first call connection, said second means establishing said second call connection while maintaining said first call connection so that said wired and wireless telephones are simultaneously connected via said first communication channel as a three-way call to said telecommunication switch.

2. The arrangement according to claim 1 wherein said interface circuit means further comprises means coupled to said third channel for converting analog voice signals received from the telecommunication switch into digital data for transmission to the base station.

3. The arrangement according to claim 1 wherein said interface circuit means further comprises means for decoupling one of said second and third channels from said first channel upon an off-hook to on-hook transition of the telephone coupled to said one channel so that the impedance presented by said one of the wired and wireless telephones does not adversely affect the connection of the telecommunications switch to said other of the wired and wireless telephones.

4. The arrangement according to claim 3 wherein said interface circuit means comprises a bridge lifter circuit.

5. The arrangement according to claim 1 wherein said interface circuit means comprises means for controlling the impedance presented to said telecommunications switch by the interface circuit means so that a conventional line terminating impedance is presented to said first communication channel when a communication path is established with only one of said wireless and wired telephones and when a communication path is simultaneously established with both of said wireless and wired telephones.

6. In a telecommunication apparatus connected by first, second, and third communication channels to, respectively, a telecommunication switch, a wired telephone, and a radio frequency base station that supports a wireless telephone, a method for transferring an in-progress telephone call between the wired telephone and wireless telephone without requiring additional action by the switch, the method comprising the steps of:

connecting said first channel to one of said second and third channels thereby establishing a first call connection between the telecommunication switch and one of the wired and wireless telephones;

connecting said first channel to the other of said second and third channels thereby establishing a second call connection between the telecommunication switch and the other of the wired and wireless telephones without causing the telecommunication switch to release said first call connection, such that said first and second call connections are simultaneously supported via said first communication channel, as a three-way call.

7. The method according to claim 6 further comprising the step of converting analog voice signals received from the telecommunication switch on the first channel into digital data for transmission to the base station by the third channel.

8. The method according to claim 6 further comprising the step of decoupling one of said second and third channels from said first channel upon an off-hook to on-hook transition of the telephone coupled to said one channel so that the impedance presented by said one of the wired and wireless telephones does not adversely affect the connection of the telecommunications switch to said other of the wired and wireless telephones.

9. The method according to claim 6 further comprising the step of controlling the impedance presented to said telecommunication switch by the telecommunication apparatus so that a conventional line terminating impedance is presented to said first communication channel when one or both of said wireless and wired telephones are off-hook.

10. The method according to claim 6 further comprising the step of controlling the impedance presented to said telecommunication switch by the telecommunication apparatus so that a conventional line terminating impedance is presented to said first communication channel when both of said wireless and wired telephones are on-hook.

11. The arrangement according to claim 1 wherein said interface means comprises means for maintaining a predetermined amount of current from said telecommunication switch regardless of whether one of said wired and wireless telephones is off hook or both of said wired and wireless telephones are simultaneously off hook, thereby presenting an expected impedance to the telecommunication switch that is not adversely affected by both of said wired and wireless telephones being simultaneously off hook.

12. The arrangement according to claim 1 further comprising means for causing said wired telephone and a corresponding wireless telephone to ring in response to a single incoming call an said first channel.

13. The arrangement according to claim 1 wherein said first means couples said first channel to the one of said wired and wireless telephones that first goes off hook in response to an incoming call.

14. The arrangement according to claim 1 further comprising a fourth communication channel coupling said radio frequency base station and said telecommunication switch, said fourth channel carrying control signals between said base station and telecommunication switch, said fourth channel being separate from said third channel which carries voice communications.

15. A telecommunication arrangement that supports the transfer of calls among wireless and wired telephones comprising:

wireless network controller coupled to a radio frequency base station that can simultaneously support a plurality of calls to wireless telephones;

first communication channel connecting said wireless network controller to a telecommunications switch;

second communication channel connecting said wireless network controller to a wired telephone;

third communication channel coupling said wireless network controller to a wireless telephone;

said wireless network controller including interface circuit means coupled to said first, second, and third channels for coupling said first channel among said second and third channels, and hence among said wired and wireless telephones, respectively, said interface means including:

means for detecting an off hook condition of each of said wireless and wired telephones coupled to said second and third channels, respectively;

first means, responsive to said detecting means detecting an off hook condition of one of said wired and wireless telephones, for connecting said first channel to a corresponding one of said second and third channels thereby establishing a first call connection between the telecommunications switch and the one telephone;

second means, responsive to said detecting means detecting an off hook condition of the other of said wired and wireless telephones, for connecting said first channel to the corresponding other of said second and third channels without causing the telecommunication switch to release said first call connection, thereby establishing a second call connection between the telecommunication switch and the other telephone.

16. The arrangement according to claim 15 wherein said second means establishes said second call connection while maintaining said first call connection so that said wired and wireless telephones are simultaneously connected via said first communication channel to said telecommunication switch.

17. The arrangement according to claim 15 wherein said interface circuit means further comprises means for decoupling one of said second and third channels from said first channel upon an off hook to on hook transition of the telephone coupled to said one channel so that the impedance presented by one of the wired and wireless telephones does not adversely affect the connection of the telecommunications switch to said other of the wired and wireless telephones.

18. The arrangement according to claim 15 wherein said interface circuit means comprises means for controlling the tropedance presented to said the communications switch by the interface circuit means so that a conventional line terminating impedance is presented to said first communication channel when a communication path is established with only one of said wireless and wired telephones and when a communication path is simultaneously established with both of said wireless an wired telephones.

19. The arrangement according to claim 15 wherein said interface means comprises means for maintaining a predetermined mount of current from said telecommunication switch regardless of whether one of said wired and wireless telephones is off hook or both of said wired and wireless telephones are simultaneously off hook, thereby presenting an expected impedance to the telecommunication switch that is not adversely affected by both of said wired and wireless telephones being simultaneously off hook.

20. The arrangement according to claim 15 wherein said first means couples said first channel to the one of said wired and wireless telephones that first goes off hook in response to an incoming call.

* * * * *